United States Patent
Amador et al.

(10) Patent No.: US 10,767,510 B2
(45) Date of Patent: Sep. 8, 2020

(54) CARBON FACE SEAL SEAT THIN WALL DESIGN

(71) Applicant: United Technologies Corporation, Farmington, CT (US)

(72) Inventors: Armando Amador, Wethersfield, CT (US); Todd A. Davis, Tolland, CT (US); Jorn Axel Glahn, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 101 days.

(21) Appl. No.: 16/269,071

(22) Filed: Feb. 6, 2019

(65) Prior Publication Data

US 2020/0248585 A1    Aug. 6, 2020

(51) Int. Cl.
   *F16J 15/34* (2006.01)
   *F01D 25/12* (2006.01)
   *F01D 11/00* (2006.01)
   *F01D 25/18* (2006.01)

(52) U.S. Cl.
   CPC ............ *F01D 25/12* (2013.01); *F01D 11/003* (2013.01); *F01D 25/183* (2013.01); *F05D 2240/55* (2013.01)

(58) Field of Classification Search
   CPC ...... F16J 15/34; F16J 15/3404; F16J 15/3464; F01D 25/12; F01D 25/183; F01D 11/003; F05D 2240/55
   See application file for complete search history.

(56) References Cited

U.S. PATENT DOCUMENTS

| | | | | |
|---|---|---|---|---|
| 2,990,202 | A | * | 6/1961 | Dennison ............. F01D 25/183 277/399 |
| 5,639,096 | A | * | 6/1997 | Ullah ................... F16J 15/3404 277/401 |
| 2008/0310953 | A1 | | 12/2008 | Garrison |
| 2016/0003100 | A1 | | 1/2016 | Walker et al. |
| 2016/0238137 | A1 | | 8/2016 | Clark et al. |
| 2018/0045316 | A1 | | 2/2018 | Kovacik et al. |

FOREIGN PATENT DOCUMENTS

EP    0391535 A1    3/1990

OTHER PUBLICATIONS

Extended European Search Report for EP Application No. 20155467.2, dated Apr. 28, 2020, 6 pages.

* cited by examiner

*Primary Examiner* — Gilbert Y Lee
(74) *Attorney, Agent, or Firm* — Kinney & Lange, P.A.

(57) ABSTRACT

A seal seat includes an annular body and an extension. The annular body is disposed about a centerline axis. The extension is connected to and extends radially outward from the annular body. The extension includes first, second, and third portions. The first portion is connected to the annular body and is defined by axially opposed upstream and downstream wall faces. The first portion includes a fin connected to the upstream wall face. The second portion is connected to the first portion and extends substantially parallel to the annular body. The third portion is connected to the second portion and extends substantially parallel to the second portion.

19 Claims, 4 Drawing Sheets

CARBON FACE SEAL SEAT THIN WALL DESIGN

BACKGROUND

The present disclosure relates to seal assemblies. More particularly, the present disclosure relates to the cooling of seal seats in a seal assembly for a gas turbine engine.

Existing seal seat designs utilized within bearing compartments sometimes include a seal seat with a series of machined holes for transporting a fluid for aiding in heat dissipation from an interface between the seal seat and another sealing element. This heat is generated frictionally as a byproduct of the seal seat rotating against the seal element while axial force is imparted against the two, often by means of a spring element. In current seal assembly applications, increasing engine rotor speeds can cause increased thermal loading, non-uniform heat dissipation, and potentially harmful temperature gradients across the sealing interface.

SUMMARY

A seal seat for a gas turbine engine includes an annular body and an extension. The annular body is disposed about a centerline axis and extends from an upstream end of the annular body to a downstream end of the annular body. The extension is connected to and extends radially outward from a first axial end of the annular body. The extension includes first, second, and third portions. The first portion is connected to the annular body and is defined by an upstream wall face and a downstream wall face axially opposite the upstream wall face. The first portion includes a fin connected to the upstream wall face and that extends axially away from the downstream wall face. The second portion is connected to an end of the first portion that is opposite from the annular body and extends substantially parallel to the annular body. The third portion is connected to the second portion at an end of the second portion that is opposite from the first portion such that the third portion extends substantially parallel to the first portion.

A method of cooling a seal seat includes delivering a fluid coolant to a first portion of the seal seat. A film of the fluid coolant is formed on the upstream wall face of the first portion of the extension. The film of the fluid coolant flows radially outward and across the upstream wall face and across the fin of the upstream wall face. Thermal energy is transferred from the first portion of the extension to the film of the fluid coolant via the fin of the upstream wall face.

A seal assembly for a gas turbine engine includes a shaft, a seal element, and a seal seat. The shaft includes an axially extending shoulder. The seal element surrounds a first portion of the shaft. The seal seat is disposed around a second portion of the shaft and is disposed adjacent to and in contact with the seal element so as to form a sealing interface with the seal element. The seal seat includes an annular body, an extension, and a first channel. The annular body is disposed about a centerline axis and extends from an upstream end of the annular body to a downstream end of the annular body. The extension is connected to and extends radially outward from a first axial end of the annular body. The extension includes first, second, and third portions. The first portion is connected to the annular body and is defined by an upstream wall face and a downstream wall face axially opposite the upstream wall face. The first portion includes a fin connected to the upstream wall face and that extends axially away from the downstream wall face. The second portion is connected to an end of the first portion that is opposite from the annular body and extends substantially parallel to the annular body. The third portion is connected to the second portion at an end of the second portion that is opposite from the first portion such that the third portion extends substantially parallel to the first portion. The first channel extends through a portion of the annular body and fluidly connects a radially inner surface of the annular body with the upstream wall face of the first portion of the extension.

The present summary is provided only by way of example, and not limitation. Other aspects of the present disclosure will be appreciated in view of the entirety of the present disclosure, including the entire text, claims, and accompanying figures.

Figure 1:
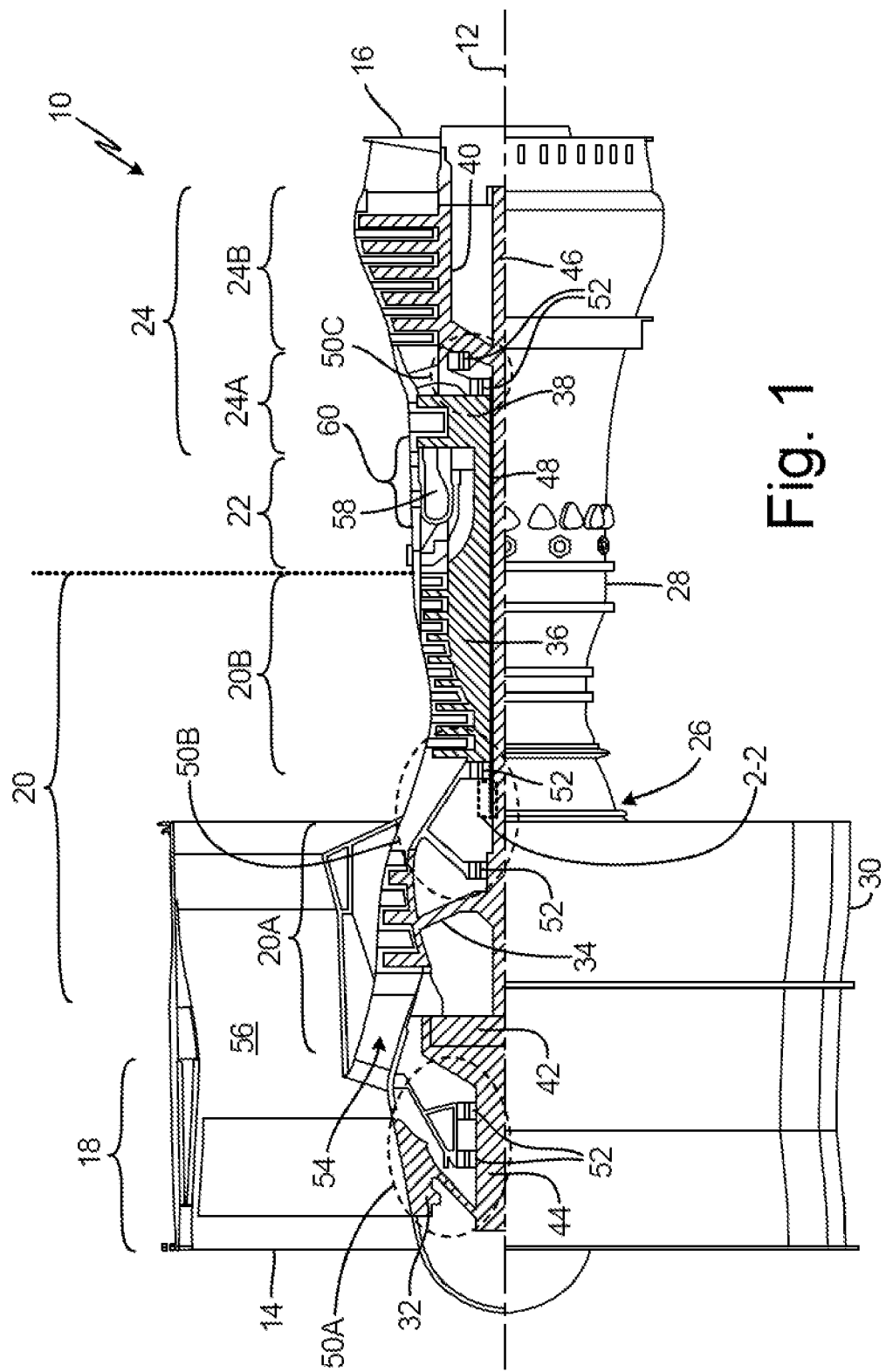
FIG. 1 is a quarter section view of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In the following disclosure, a series of fin-like features (e.g., circumferential or spiral) are added to an axial cooling wall of a seal seat to provide greater surface area to the seal seat for increased heat dissipation away from the seal interface, thereby reducing wear and/or heat damage to the seal.

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, and combustor 60.

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Figure 2:
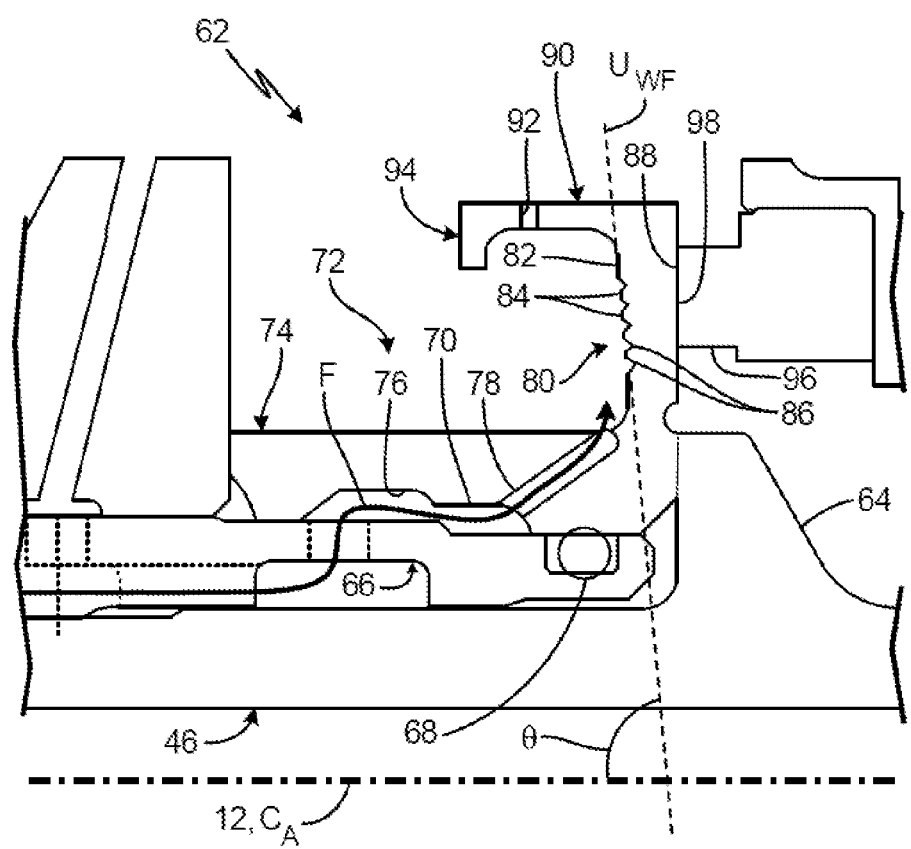
FIG. 2 is an enlarged cross-section view of portion 2-2 in FIG. 1 showing a seal assembly with a sealing plate including fin features on a cooling wall of the seal seat.

FIG. 2 is an enlarged cross-section view of portion 2-2 in FIG. 1 showing a portion of bearing compartment 50B with seal assembly 62. FIG. 2 shows axial centerline 12, high speed shaft 46 (with shoulder 64), annular element 66, O-ring 68, pocket 70, seal seat 72 (with annular body 74, centerline axis $C_A$ of annular body 74, radially inner surface 76 of annular body 74, first channel 78, first portion 80 (including upstream wall face 82, fins 84, grooves 86, and downstream wall face 88), second portion 90 (with second channel 92), and third portion 94), seal element 96 (with sealing interface 98), plane $U_{WF}$, angle θ, and flow F. Although seal assembly 62 is discussed as being disposed in bearing compartment 50B, seal assembly 62 can be disposed in any one of bearing compartments 50A, 50B, 50C, or another compartment of gas turbine engine 10. Likewise, in another non-limiting embodiment, high speed shaft 46 as shown in FIG. 2 can be representative of fan shaft 44 or low speed shaft 48 of gas turbine engine 10.

Shoulder 64 is a projection of solid material. Annular element 66 is a contoured tube of solid material. O-ring 68 is a circular gasket. Pocket 70 is a void or space. Seal seat 72 is a seal element for rotary applications. In this embodiment, seal seat 72 is a seat for a seal. Annular body 74 is a ring or tube of solid material. Radially inner surface 76 is a radially inner surface of annular body 74. Centerline axis $C_A$ is a radially centered axis of annular body 74. First channel 78 and second channel 92 are passages or conduits configured to transfer a fluid. In this embodiment, a single first channel 78 and a single second channel 92 are shown in FIG. 2, however seal seat 72 can include a plurality of first channels 78 and second channels 90 disposed along a circumference of seal seat 72.

First portion 80 is an annular disk of solid material. Upstream wall face 82 and downstream wall face 88 are axially facing side-walls. Fins 84 are extensions of solid material. Grooves 86 are depressions or ruts. In one non-limiting embodiment, a cross-section shape of one or more of grooves 86 can include a V-shape, U-shape, square shape, or other geometric shape. In another non-limiting embodiment fins 84 can include gaps or spaces disposed uniformly or non-uniformly around a circumference of fins 84 such that the spaces or grooves effectuate a metering or pumping effect of flow F out of grooves 86. In yet another embodiment, grooves 86 can include a radially outward wall that leans or is slanted in a radially outward direction to promote or increase an amount of flow F to exit grooves 86. Second portion 90 is a ring or tube of solid material. Third portion 94 is an annular disk of solid material. Seal element 96 is a face seal. In this embodiment, seal element 96 is a carbon seal nose. Sealing interface 98 is an interface or minor gap between and an axial end of seal seat 72 and an axial end of seal element 96. Plane $U_{WF}$ is imaginary reference plane defining the general un-contoured orientation of upstream wall face 82 of first portion 80. Angle θ is an angle between axial centerline 12 and plane $U_{WF}$. Flow F is a flow of fluid. In this embodiment, flow F includes a flow of liquid lubricant and/or coolant.

Shoulder 64 is connected to and extends radially outward from high speed shaft 46. Annular element 66 is disposed radially between portions of high speed shaft 46 and annular body 74 of seal seat 72. O-ring 68 is disposed between portions of annular element 66 and annular body 74 of seal seat 72. Pocket 70 is formed by and disposed between portions of annular element 66 and annular body 74 of seal seat 72. Pocket 70 is fluidly connected to first channel 78 and is in fluid communication with upstream wall face 82 of first portion 80 via first channel 78. Seal seat 72 is disposed within bearing compartment 50B and is in contact with shoulder 64 and annular element 66. Annular body 74 is disposed around high speed shaft 46 and around annular body 66. Radially inner surface 76 of annular body 74 faces pocket 70. First channel 78 is disposed in and extends through a portion of annular body 74 of seal seat 72.

First portion 80 is connected to and extends radially outward from annular body 66. First portion 80 is defined by upstream wall face 82 and downstream wall face 88 axially opposite upstream wall face 82. Upstream wall face 82 is disposed along an upstream side of first portion 80. Upstream wall face 82 is axially opposite downstream wall face 88 (and vice versa). Fins 84 are disposed in upstream wall face 82 of first portion 80. In this embodiment, fins 84 extend in an upstream direction (e.g., right to left as shown in FIG. 2) and axially away from downstream wall face 88 of first portion 80.

Grooves 86 are formed by and disposed between fins 84. In this embodiment, grooves 86 can extend into a portion of upstream wall face 82 of first portion 80. In one embodiment, grooves 86 can extend into a portion of upstream wall face 82 along a direction parallel to axial centerline 12. In another embodiment, grooves 86 can extend into a portion of upstream wall face 82 along a direction that is perpendicular to plane $U_{WF}$. In this embodiment, fins 84 and/or grooves 86 can be formed into upstream wall face 82 with etching as well as conventional or non-conventional manufacturing techniques. Downstream wall face 88 is disposed along a downstream side of first portion 80. In this embodiment, downstream wall face 88 can be in contact with or form a small gap between seal element 96 at sealing interface 98.

Second portion 90 is connected to and extends axially (in an upstream direction as shown from right to left in FIG. 2) from a radially outward end of first portion 80 of seal seat 72. Second channel 92 is disposed in and extends through second portion 90 of seal seat 72. Third portion 94 is connected to and extends radially inward from an axially upstream end of second portion 90 of seal seat 72. Seal element 96 is disposed around and axially spaced apart from shoulder 64 of low speed shaft 46. Sealing interface 98 is formed at the interface between downstream wall face 88 of first portion 80 and an upstream face of seal element 96. Plane $U_{WF}$ extends parallel to upstream wall face 82 of first portion 80. In this embodiment, angle θ is between 65 and 90 degrees. For example, angle θ can be 80 degrees. Flow F passes along and through portions of annular element 66, into pocket 70, into first channel 78, and onto upstream wall face 82 of first portion 80.

Shoulder 64 acts as an axial stop for preventing relative axial motion between high speed shaft 46 and seal seat 72. For example, shoulder 64 absorbs any axial forces or loads (in a downstream direction, left to right as shown in FIG. 2) experienced by seal seat 72. Annular element 66 is used to position seal seat 72 a distance from high speed shaft 46 as well as to provide for fluid delivery to pocket 70 and first channel 78. O-ring 68 prevents fluid from flowing past O-ring 68 so as to maintain flow F along pocket 70 and into first channel 78. Pocket 70 provides a conduit through which flow F flows from annular element 66 to first channel 78 in annular body 74.

Seal seat 72 forms sealing interface 98 with seal element 96 in order to provide a face seal for a rotating interface. In this example, seal seat 72 rotates with high speed shaft 46 and relative to seal element 96. Annular body 74 functions to attach seal seat 72 onto and/or around annular element 66. Radially inner surface 76 of annular element 66 forms a radially outward fluidic barrier of pocket 70 so as to guide flow F through pocket 70 and into first channel 78. First channel 78 communicates and transports flow F from pocket 70, through annular body 74, and to upstream wall face 82 of first portion 80.

First portion 80 provides a thermal energy transfer function by transferring thermal energy from sealing interface 98 to flow F. First portion 80 of seal seat 72 also structurally supports second portion 90 of seal seat 72 so as to maintain the shape and configuration of seal seat 72. In this embodiment, upstream wall face 82 provides a cooling function to seal seat 72 by transferring thermal energy from first portion 80, through fins 84 and grooves 86, and to flow F that flows along upstream wall face 82. Fins 84 increase the amount of surface area of upstream wall face 82 to provide for increased heat dissipation from first portion 80 of seal seat 72 to flow F. Grooves 86 contain portions of flow F to keep flow F in contact with first portion 80 of seal seat 72 for longer periods of time as compared to existing seal seat designs without fins 84 and/or grooves 86. Downstream wall face 88 of first portion 80 forms sealing interface 98 with an upstream end of seal element 96.

In combination with first portion 80 and third portion 94, second portion 90 forms a scoop to collect or partially trap a portion of flow F. Second portion 90 acts as a fluidic barrier to keep portions of flow F contained in an annular space formed by annular body 74, first portion 80, and second portion 90 (and by extension third portion 94). Second channel 92 functions as a fluidic outlet through which portion of flow F passes through thereby allowing flow F to exit out of the annulus formed by annular body 74, first portion 80, and second portion 90. Third portion 94 further assists with containing portions of flow F in the annulus formed in the space between annular body 74, first portion 80, second portion 90, and third portion 94. In containing portions of flow F, a dwell time of flow F contained in seal seat 72 increases thereby increasing the amount of thermal energy transfer from seal seat 72 to flow F.

Seal element 96 interacts with downstream wall face 88 of seal seat 72 to form a fluidic seal at sealing interface 98. Sealing interface 98 prevents transmission of a fluid across sealing interface 98 during operation of engine 10. Plane $U_{WF}$ is set at angle θ less than 90 degrees, causing a rate of flow of flow F to slow down as flow F passes across upstream wall face 82 as compared to an example of angle θ being set at 90 degrees.

Flow F flows through portions of seal seat 72 and absorbs thermal energy from the portions of seal seat 72 flow F comes into contact with. Additionally, flow F passes across and in contact with upstream wall face 82 to absorb thermal energy from first portion 80 of seal seat 72. In particular, flow F flows into grooves 86 to interact with fins 84 that provide an increased surface area across which an increased amount of thermal energy can be transferred from first portion 80 of seal seat 72 to flow F. During operation, flow F occupies the annular space formed by annular body 74, first portion 80, second portion 90, and third portion 94 for some time before exiting that space through second channel 92 in second portion 90.

Seal seat 72 with fins 84 provides the benefit of an increased amount of thermal energy that can be removed from seal seat 72. Additionally, grooves 86 form cooling passages that are a consistent distance from sealing interface 98 which minimizes the occurrence of a radial temperature gradient across sealing interface 98. Each of these benefits helps to maintain a healthy temperature at seal interface 98 to reduce the potential of rapid wear and/or heat damage to seal element 96 and/or seal seat 72. Benefits of seal seat 72 also include a compact design, compatibility with existing oil management systems, increases in the effective surface area of coolant interaction, and a more uniform cooling flow distribution to the interface region (e.g., sealing interface 98) of seal assembly 62.

Figure 3A:
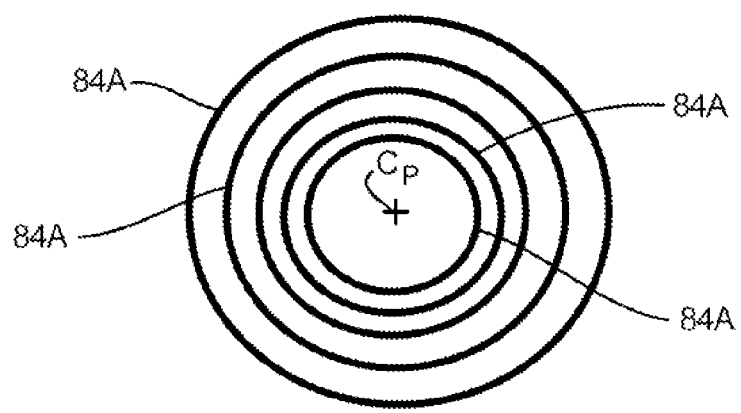
FIG. 3A is a simplified front view of a first set of fins shown in a circumferential configuration.
Figure 3B:
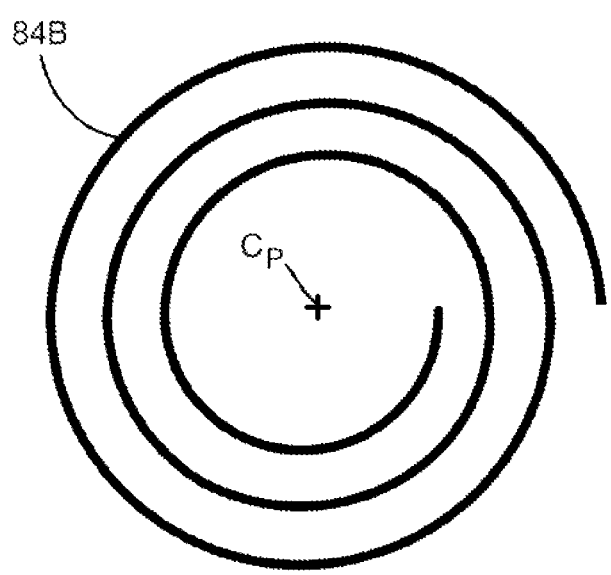
FIG. 3B is a simplified front view of a second fin shown in a counter-clockwise spiral configuration.

FIGS. 3A and 3B are simplified front views of embodiments of fins 84. FIG. 3A illustrates fins 84A in a circumferential configuration about centerpoint $C_P$, while FIG. 3B illustrates fin 84B in a counter-clockwise spiral configuration. FIGS. 3A and 3B will be discussed together. In the embodiments shown in FIGS. 3A and 3B, the views are taken from a position upstream of seal seat 72 and facing a downstream direction (upstream and downstream as shown in FIG. 2).

Fin 84A and fins 84B correspond to fins 84 as shown in FIG. 2 and include protrusions formed between grooves 86 (shown in FIG. 2). Fins 84A are a series of concentric, circular shaped fins. Center point $C_P$ is a radial center of fins 84A. Fin 84B is singular, spiral shaped fin. In this embodiment, fin 84B is shown as including a counter-clockwise spiral configuration. In another embodiment, fin 84B can include a clockwise spiral configuration. In further embodiments, there can be more than one fin 84B included in the configuration, for example, positioned concentrically with each other.

In this embodiment, center point $C_P$ is coaxial with centerline axis CA of annular body 74. In one embodiment, fins 84A extend axially (in an upstream direction) from upstream wall face 82 of first portion 80 of seal seat 72. In another embodiment, fin 84B extends axially (in an upstream direction) from upstream wall face 82 of first portion 80 of seal seat 72.

Fins 84A are configured to provide increased surface area for flow F to flow across as portions of flow F move radially outward along first portion 80 during operation. For example, as flow F moves radially outward along upstream wall face 82, flow F flows across the additional surface area added to upstream wall face 82 by fins 84A. This flow F across the added surface area of fins 84A (and 84B) increases the amount of conductive (and convective) cooling performed by flow F via thin film cooling. Fin 84B performs a similar function as fins 84A by adding additional surface area to upstream wall face 82.

Figure 4:
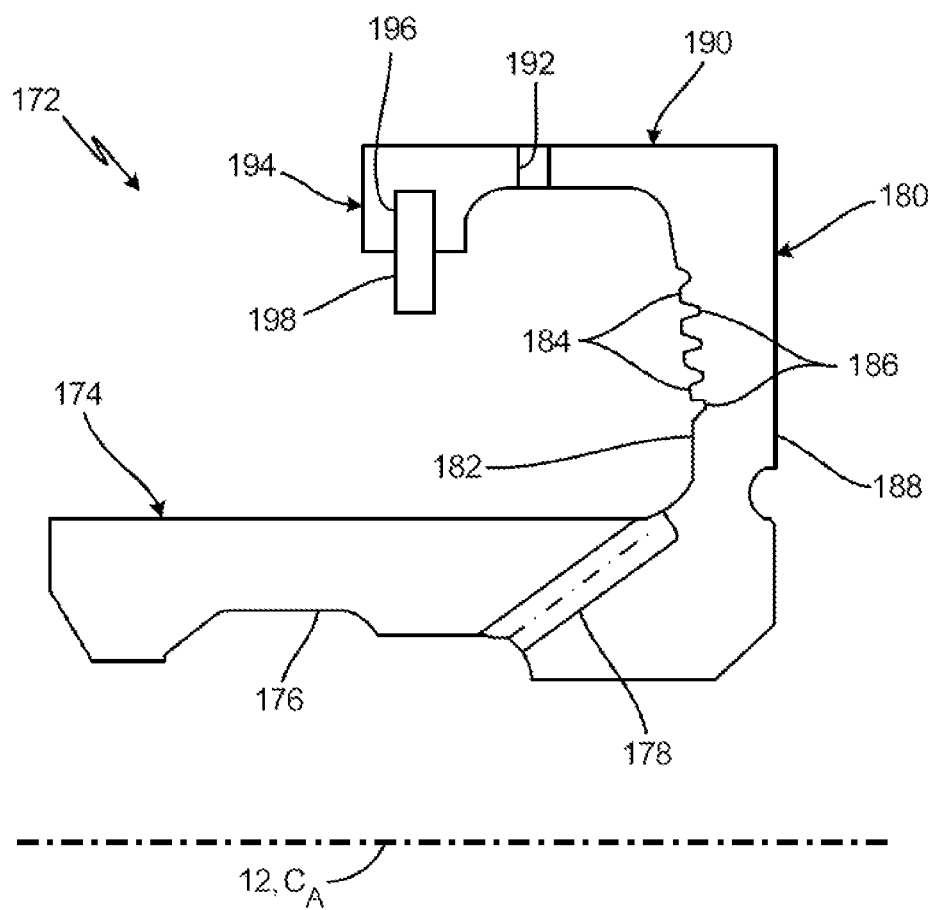
FIG. 4 is a cross-section view of another seal seat of the seal assembly, the seal seat shown with a retaining ring.

FIG. 4 is a cross-section view of seal seat 172 and shows annular body 174, centerline axis $C_A$ of annular body 174, radially inner surface 176 of annular body 174, first channel 178, first portion 180 (including upstream wall face 182, fins 184, grooves 186, and downstream wall face 188), second portion 190 (with second channel 192), third portion 194, slot 196, and retaining ring 198. In this embodiment, seal seat 172, annular body 174, centerline axis $C_A$ of annular body 174, radially inner surface 176 of annular body 174, first channel 178, first portion 180 (including upstream wall face 182, fins 184, grooves 186, and downstream wall face 188), second portion 190 (with second channel 192), and third portion 194 correspond to seal seat 72, annular body 74, centerline axis $C_A$ of annular body 74, radially inner surface 76 of annular body 74, first channel 78, first portion 80 (including upstream wall face 82, fins 84, grooves 86, and downstream wall face 88), second portion 90 (with second channel 92), and third portion 94 as shown in and described with respect to FIG. 2 herein.

As shown in FIG. 4, centerline axis CA of annular body 174 is co-axial with axial centerline 12 of gas turbine engine 10. Slot 196 is a space or aperture in the shape of a ring. Retaining ring 198 is a ring or disk with a hole. Slot 196 is disposed in third portion 194 of seal seat 174. In this embodiment, a radially outer portion of retaining ring 198 is disposed in slot 196. In one embodiment, different sized retaining rings can be swapped in and out of slot 196 so as to provide varying degrees of fluid entrapment.

Slot 196 holds retaining ring 198 in place relative to third portion 194 of seal seat 174. Retaining ring 198 provides a dam or weir to contain and/or trap flow F in the annular space formed by annular body 176, first portion 180, second portion 190, and third portion 194. The addition of retaining ring 198 allows for a removable portion of third portion 194 which can aid in the manufacture of seal seat 174. For example, removal of retaining ring 198 provides the ability to manufacture a deeper trough in seal seat 174 without sacrificing a surface area of upstream wall face 182 that is grooved.

Discussion of Possible Embodiments

A seal seat for a gas turbine engine includes an annular body and an extension. The annular body is disposed about a centerline axis and extends from an upstream end of the annular body to a downstream end of the annular body. The extension is connected to and extends radially outward from a first axial end of the annular body. The extension includes first, second, and third portions. The first portion is connected to the annular body and is defined by an upstream wall face and a downstream wall face axially opposite the upstream wall face. The first portion includes a fin connected to the upstream wall face and that extends axially away from the downstream wall face. The second portion is connected to an end of the first portion that is opposite from the annular body and extends substantially parallel to the annular body. The third portion is connected to the second portion at an end of the second portion that is opposite from the first portion such that the third portion extends substantially parallel to the first portion.

The assembly of the preceding paragraph can optionally include, additionally and/or alternatively, any one or more of the following features, configurations and/or additional components.

The fin can comprise a plurality of fins each extending circumferentially along the first portion of the extension, wherein the plurality of fins can be positioned concentrically relative to one another and/or coaxially with the centerline axis of the annular body.

The fin can comprise a spiral shape revolving around a center point of the fin, wherein the center point of the fin can be coaxial with the centerline axis of the annular body.

The third portion can include a slot formed in an end of the third portion opposite from the second portion, wherein the seal seat can further comprise a retaining ring, wherein a portion of the retaining ring can be disposed in the slot of the third portion.

The upstream wall face of the first extension can extend along a plane that forms a first angle with the centerline axis of the annular body, wherein the first angle can be between 65 and 90 degrees.

A first channel can extend through a portion of the annular body, wherein the first channel fluidly can connect a radially inner surface of the annular body with the upstream wall face of the first portion of the extension.

A second channel can be disposed in and/or can extend through the second portion, wherein the second channel can be a fluidic outlet.

A method of cooling a seal seat includes delivering a fluid coolant to a first portion of the seal seat. A film of the fluid coolant is formed on the upstream wall face of the first portion of the extension. The film of the fluid coolant flows radially outward and across the upstream wall face and across the fin of the upstream wall face. Thermal energy is transferred from the first portion of the extension to the film of the fluid coolant via the fin of the upstream wall face.

The method of the preceding paragraph can optionally include, additionally and/or alternatively, any one or more of the following steps, features, configurations and/or additional components.

The fluid coolant can be provided through a first channel extending through a portion of the annular body, wherein the first channel can fluidly connect a radially inner surface of the annular body with the upstream wall face of the first portion of the extension.

A portion of the fluid coolant can be output from the seal seat through a second channel disposed in and/or extending through the second portion of the extension.

A portion of the fluid coolant can be retained in the seal seat with a retaining ring disposed in a slot formed in an end of the third portion opposite from the second portion.

A portion of the fluid coolant can be guided along the fin, wherein the fin can comprise a spiral shape revolving around a center point of the fin, wherein the center point of the fin can be coaxial with the centerline axis of the annular body.

A seal assembly for a gas turbine engine includes a shaft, a seal element, and a seal seat. The shaft includes an axially extending shoulder. The seal element surrounds a first portion of the shaft. The seal seat is disposed around a second portion of the shaft and is disposed adjacent to and in contact with the seal element so as to form a sealing interface with the seal element. The seal seat includes an annular body, an extension, and a first channel. The annular body is disposed about a centerline axis and extends from an upstream end of the annular body to a downstream end of the annular body. The extension is connected to and extends radially outward from a first axial end of the annular body. The extension includes first, second, and third portions. The first portion is connected to the annular body and is defined by an upstream wall face and a downstream wall face axially opposite the upstream wall face. The first portion includes a fin connected to the upstream wall face and that extends axially away from the downstream wall face. The second portion is connected to an end of the first portion that is opposite from the annular body and extends substantially parallel to the annular body. The third portion is connected to the second portion at an end of the second portion that is opposite from the first portion such that the third portion extends substantially parallel to the first portion. The first channel extends through a portion of the annular body and fluidly connects a radially inner surface of the annular body with the upstream wall face of the first portion of the extension.

The assembly of the preceding paragraph can optionally include, additionally and/or alternatively, any one or more of the following features, configurations and/or additional components.

A plurality of fins can each extend circumferentially along the first portion of the extension, wherein the plurality of fins can be positioned concentrically relative to one another and/or coaxially with the centerline axis of the annular body.

The fin can comprise a spiral shape revolving around a center point of the fin, wherein the center point of the fin can be coaxial with the centerline axis of the annular body.

The third portion can include a slot formed in an end of the third portion opposite from the second portion, wherein the seal seat can further comprise a retaining ring, wherein a portion of the retaining ring can be disposed in the slot of the third portion.

The upstream wall face of the first extension can extend along a plane that forms a first angle with the centerline axis of the annular body, wherein the first angle can be between 65 and 90 degrees.

A first channel can extend through a portion of the annular body, wherein the first channel can fluidly connect a radially inner surface of the annular body with the upstream wall face of the first portion of the extension.

A second channel can be disposed in and extend through the second portion, wherein the second channel can be a fluidic outlet.

The invention claimed is:

1. A seal seat for a gas turbine engine, the seal seat comprising:
    an annular body disposed about a centerline axis, the annular body extending from an upstream end of the annular body to a downstream end of the annular body; and
    an extension connected to and extending radially outward from a first axial end of the annular body, wherein the extension comprises:
        a first portion connected at an inner radial extent to the annular body and defined by an upstream wall face and a downstream wall face axially opposite the upstream wall face, wherein the first portion comprises a fin at the upstream wall face and extending axially away and upstream from the downstream wall face;
        a second portion connected to an outer radial extent of the first portion, wherein the second portion extends substantially parallel to the annular body, and axially forward from the first portion; and
        a third portion connected to the second portion at an end of the second portion that distal from the first portion, wherein the third portion extends substantially parallel to the first portion.

2. The seal seat of claim 1, wherein the fin comprises a plurality of fins each extending circumferentially along the first portion of the extension, wherein the plurality of fins are positioned concentrically relative to one another and coaxially with the centerline axis of the annular body.

3. The seal seat of claim 1, wherein the fin comprises a spiral shape revolving around a center point of the fin, wherein the center point of the fin is coaxial with the centerline axis of the annular body.

4. The seal seat of claim 1, wherein the third portion includes a slot formed in an end of the third portion opposite from the second portion, wherein the seal seat further comprises a retaining ring, wherein a portion of the retaining ring is disposed in the slot of the third portion.

5. The seal seat of claim 1, wherein the upstream wall face of the first extension extends along a plane that forms a first angle with the centerline axis of the annular body, wherein the first angle is between 65 and 90 degrees.

6. The seal seat of claim 1, further comprising a first channel extending through a portion of the annular body, wherein the first channel fluidly connects a radially inner surface of the annular body with the upstream wall face of the first portion of the extension.

7. The seal seat of claim 1, further comprising a second channel disposed in and extending through the second portion, wherein the second channel is a fluidic outlet.

8. A method of cooling a seal seat, the method comprising:
    delivering a fluid coolant to a first portion of the seal seat, wherein the seal seat comprises:
        an annular body disposed about a centerline axis, the annular body extending from an upstream end of the annular body to a downstream end of the annular body; and an extension connected to and extending radially outward from a first axial end of the annular body, wherein the extension comprises:
the first portion connected at an inner radial extent to the annular body and defined by an upstream wall face and a downstream wall face axially opposite the upstream wall face, wherein the first portion comprises a fin at the upstream wall face and extending axially away and upstream from the downstream wall face;
a second portion connected to an outer radial extent of the first portion, wherein the second portion extends substantially parallel to the annular body, and axially forward from the first portion; and
a third portion connected to the second portion at an end of the second portion that distal from the first portion, wherein the third portion extends substantially parallel to the first portion;
forming a film of the fluid coolant on the upstream wall face of the first portion of the extension;
flowing the film of the fluid coolant radially outward and across the upstream wall face and across the fin of the upstream wall face; and
transferring thermal energy from the first portion of the extension to the film of the fluid coolant via the fin of the upstream wall face.

9. The method of claim 8, wherein delivering a fluid coolant to a first portion of the seal seat comprises providing the fluid coolant through a first channel extending through a portion of the annular body, wherein the first channel fluidly connects a radially inner surface of the annular body with the upstream wall face of the first portion of the extension.

10. The method of claim 8, further comprising outputting a portion of the fluid coolant from the seal seat through a second channel disposed in and extending through the second portion of the extension.

11. The method of claim 8, further comprising retaining a portion of the fluid coolant in the seal seat with a retaining ring disposed in a slot formed in an end of the third portion opposite from the second portion.

12. The method of claim 8, wherein flowing the film of the fluid coolant radially outward and across the upstream wall face comprises guiding a portion of the fluid coolant along the fin, wherein the fin comprises a spiral shape revolving around a center point of the fin, wherein the center point of the fin is coaxial with the centerline axis of the annular body.

13. A seal assembly for a gas turbine engine, the seal assembly comprising:
a shaft with an axially extending shoulder;
a seal element surrounding a first portion of the shaft;
a seal seat disposed around a second portion of the shaft, wherein the seal seat is disposed adjacent to and in contact with the seal element so as to form a sealing interface with the seal element, wherein the seal seat comprises:
an annular body disposed about a centerline axis, the annular body extending from an upstream end of the annular body to a downstream end of the annular body;
an extension connected to and extending radially outward from a first axial end of the annular body, wherein the extension comprises:
a first portion connected at an inner radial extent to the annular body and defined by an upstream wall face and a downstream wall face axially opposite the upstream wall face, wherein the first portion comprises a fin at the upstream wall face and extending axially away and upstream from the downstream wall face;
a second portion connected to an outer radial extent of the first portion, wherein the second portion extends substantially parallel to the annular body, and axially forward from the first portion; and
a third portion connected to the second portion at an end of the second portion that distal from the first portion, wherein the third portion extends substantially parallel to the first portion; and
a first channel extending through a portion of the annular body, wherein the first channel fluidly connects a radially inner surface of the annular body with the upstream wall face of the first portion of the extension.

14. The seal assembly of claim 13, wherein the fin comprises a plurality of fins each extending circumferentially along the first portion of the extension, wherein the plurality of fins are positioned concentrically relative to one another and coaxially with the centerline axis of the annular body.

15. The seal assembly of claim 13, wherein the fin comprises a spiral shape revolving around a center point of the fin, wherein the center point of the fin is coaxial with the centerline axis of the annular body.

16. The seal assembly of claim 13, wherein the third portion includes a slot formed in an end of the third portion opposite from the second portion, wherein the seal seat further comprises a retaining ring, wherein a portion of the retaining ring is disposed in the slot of the third portion.

17. The seal assembly of claim 13, wherein the upstream wall face of the first extension extends along a plane that forms a first angle with the centerline axis of the annular body, wherein the first angle is between 65 and 90 degrees.

18. The seal assembly of claim 13, further comprising a first channel extending through a portion of the annular body, wherein the first channel fluidly connects a radially inner surface of the annular body with the upstream wall face of the first portion of the extension.

19. The seal assembly of claim 13, further comprising a second channel disposed in and extending through the second portion, wherein the second channel is a fluidic outlet.

* * * * *